United States Patent
Hebding et al.

(10) Patent No.: US 6,489,750 B2
(45) Date of Patent: Dec. 3, 2002

(54) METHOD AND APPARATUS FOR CHARGING RECHARGEABLE BATTERIES

(75) Inventors: Uwe Hebding, München (DE); Georg Koch, Unterschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/903,356

(22) Filed: Jul. 11, 2001

(65) Prior Publication Data

US 2001/0048288 A1 Dec. 6, 2001

Related U.S. Application Data

(63) Continuation of application No. PCT/DE99/02485, filed on Aug. 9, 1999.

(30) Foreign Application Priority Data

Jan. 11, 1999 (DE) .......................................... 199 00 634

(51) Int. Cl.[7] .............................. H02J 7/00; H02J 7/14
(52) U.S. Cl. ...................................... 320/139; 320/162
(58) Field of Search ................................ 320/136, 162, 320/157, 164

(56) References Cited

U.S. PATENT DOCUMENTS

| | | | |
|---|---|---|---|
| 4,885,522 A | 12/1989 | Konopka | |
| 5,296,797 A | 3/1994 | Bartlett | |
| 5,773,963 A | * 6/1998 | Blanc et al. | ................ 320/145 |
| 6,020,720 A | * 2/2000 | Corbridge | .................. 320/125 |

\* cited by examiner

*Primary Examiner*—Gregory J. Toatley, Jr.
(74) *Attorney, Agent, or Firm*—Laurence A. Greenberg; Werner H. Stemer; Ralph E. Locher

(57) ABSTRACT

A method and apparatus for charging a rechargeable battery with a current from a controllable current source. In order to adjust the rated current of the controllable current source, at least one operating parameter of the rechargeable battery, such as the rechargeable battery voltage which is produced as a consequence of a charging process, is detected. A pulsed control signal with a duty ratio which corresponds to the desired rated current is produced as a function of the operating parameter. The duty ratio of the pulsed control signal is evaluated, and the rated current of the current source is adjusted as a function of the duty ratio of the pulsed control signal.

31 Claims, 2 Drawing Sheets

(t = T$_1$)

(t = T$_2$)

(t = T$_3$)

METHOD AND APPARATUS FOR CHARGING RECHARGEABLE BATTERIES

CROSS-REFERENCE TO RELATED APPLICATION

This application is a continuation of copending International Application No. PCT/DE99/02485, filed Aug. 9, 1999, which designated the United States.

BACKGROUND OF THE INVENTION

1. Field of the Invention

The present invention relates to a method and an appropriate apparatus for charging rechargeable batteries.

Various rechargeable batteries, such as lead-acid or lithium-ion rechargeable batteries, need to be charged using a voltage source whose current is limited, in which the voltage is regulated very accurately and, in some circumstances, must also be varied as a function of the temperature of the rechargeable battery cells, in order to compensate for temperature-dependent fluctuations during the charging process. In this case, the voltage source makes use of current limiting, which limits the charging current supplied from the voltage source. The current limiting is in this case particularly effective when a completely discharged rechargeable battery is connected to the voltage source. FIG. 2 illustrates a conventional method for charging rechargeable batteries, and the way in which the current limiting operates. As shown in FIG. 2, a charging voltage $U_L$ which is less than the maximum permissible charging voltage $U_{max}$ is initially applied to the rechargeable battery. As the charging process progresses, the charging voltage is raised and increases up to the regulator voltage $U_{max}$ setting. The voltage from the voltage source $U_L$ is then limited to this preset value $U_{max}$ by means of the voltage regulation setting. The internal rechargeable battery voltage, that is to say the no-load voltage of the rechargeable battery, which is produced as a result of the charging process, rises as the charging process progresses. Conversely, this means that, since the charging voltage $U_L$ is now kept constant and, to a first approximation, the internal resistance of the rechargeable battery is assumed to be constant, the current drawn or the charging current $I_L$ of the rechargeable battery falls continuously from the time $T_2$ at which the voltage limiting starts. The charge state of the rechargeable battery can thus be deduced from the magnitude of the charging current $I_L$. Conversely, the charging current $I_L$ must be monitored in order to detect when it falls below a predetermined lower limit value, in order in this case to terminate the charging process, and to switch off the charging voltage source, immediately or after a specific time.

The charging voltage source may be in the form of a high-precision voltage source (in the form of a linear or switched-mode regulator) with current limiting. This high-precision voltage source is accommodated in the immediate vicinity of the rechargeable battery, that is to say very close to the rechargeable battery being charged, or can be connected to the rechargeable battery via so-called sense lines. These sense lines are lines that are provided in addition to the current-carrying lines which are used for charging the rechargeable battery. The sense lines do not carry current, and are intended exclusively for monitoring the charge state of the rechargeable battery. However, this procedure has the disadvantage that, despite its space requirement and its heat losses, the charging voltage source must be accommodated close to the rechargeable battery to be charged, or the wiring complexity and/or the complexity of the plug connections are/is increased by the use of the sense lines.

The charging current is measured, in a known manner, by inserting a shunt resistor into the charging circuit and by measuring the voltage dropped across this resistor. The use of such a shunt resistor in turn results in the disadvantage that it causes an additional voltage drop in the charging circuit, which slows down the charging process. Furthermore, the monitoring of the voltage dropped across the shunt resistor represents a level of complexity which is not insignificant for measured-value detection. This is particularly true if the shunt resistor needs to be inserted in the positive line rather than in the ground line (for example if the rechargeable battery is coupled to ground via the appliance to be operated).

Furthermore, the conventional procedure described above results in the problem that different types of rechargeable batteries (for example NiCd/NiMH or Li-Ion rechargeable batteries) cannot be charged at the same time since their final charging voltages are of different magnitude. Generally, NiCd/NiMH rechargeable batteries are charged with a constant current, independently of the charging voltage.

A further known option for charging rechargeable batteries is to use a regulated, that is to say variable, current source, in which case the charging current supplied to the rechargeable battery is regulated by varying the duty ratio of a pulsed signal which is applied to a switch provided in a current-carrying conductor. In particular, the internal rechargeable battery voltage of the rechargeable battery is monitored, and the duty ratio, that is to say the pulse-pause ratio of the switch, and hence the charging current as well, are regulated as a function of this. A battery charger of this type is described in U.S. Pat. No. 4,885,522. In the circuit described there, the emitter-collector path through a transistor which is used as a line circuit-breaker, and an inductance in series with it, are connected in the charging circuit. The base of this switching transistor is connected to the output of a Schmitt trigger. In operation, this circuit represents an oscillator, which uses the switching transistor to produce a pulsed charging current. The duty ratio of the pulsed charging current is governed by the hysteresis of the Schmitt trigger, which is in turn governed by the switching state of a temperature filter connected to the battery to be charged. This circuit allows high switching frequencies to be achieved, and thus makes it possible to reduce the amount of heat produced in the switching transistor. This concept admittedly allows different rechargeable battery technologies (for example NiMH or Li-Ion rechargeable batteries) to be charged without any additional complexity arising from variable current limits in one and the same appliance. However, current overshoots occur at the switching time of the switch and can lead to a short-term overvoltage being applied to the rechargeable battery at the switching times, and because of the regular pulsed operation, this would lead to the rechargeable battery being damaged over a period of time. Increased efforts are therefore required for the design of the electronics for the current source used, in order to limit the previously described current overshoots at the switching times, although this is associated with increased costs.

SUMMARY OF THE INVENTION

It is accordingly an object of the invention to provide a method and an appropriate apparatus which overcome the above-mentioned disadvantageous of the prior art methods and apparatus of this general type, and which enable rechargeable batteries to be charged reliably with little complexity.

In particular it is intended to be possible to charge rechargeable batteries based on different rechargeable battery.

With the foregoing and other objects in view there is provided, in accordance with the invention a method for charging a rechargeable battery, that includes steps of: charging a rechargeable battery with an unpulsed rated current supplied from a variable current source; detecting at least one operating parameter of the rechargeable battery; providing a pulsed control signal having a specific duty ratio and producing the duty ratio as a function of the operating parameter; and adjusting the unpulsed rated current supplied from the current source as a function of the duty ratio of the pulsed control signal.

In accordance with an added mode of the invention, a rechargeable battery voltage that is produced as a consequence of charging the rechargeable battery is detected; and the rechargeable battery voltage is used as the operating parameter.

In accordance with an additional mode of the invention, the duty ratio of the pulsed control signal is increased if the detected rechargeable battery voltage of the rechargeable battery is less than a desired charging voltage; and the duty ratio is decreased if the detected rechargeable battery voltage of the rechargeable battery is greater than the desired charging voltage.

In accordance with another mode of the invention, the rechargeable battery voltage is digitally averaged before evaluating the rechargeable battery voltage.

In accordance with a further mode of the invention, the duty ratio of the pulsed control signal is adjusted as a function of a current characteristic that is specific to the current source.

In accordance with a further added mode of the invention, the method includes steps of: before starting the step of charging the rechargeable battery, measuring the input impedance of the current source to determine a type of the current source; and basing the charging on a current characteristic that corresponds to the determined type of the current source.

In accordance with a further additional mode of the invention, the duty ratio of the pulsed control signal is adjusted as a function of a type of rechargeable battery.

In accordance with a further still added mode of the invention, the temperature of the rechargeable battery is detected; and the detected temperature is used as the operating parameter.

In accordance with a further still additional mode of the invention, the step of determining the operating parameter of the rechargeable battery is performed at regular intervals.

In accordance with a further still mode of the invention, the unpulsed rated current of the current source is increased as the duty ratio of the pulsed control signal increases.

In accordance with yet an added mode of the invention, a difference between the detected rechargeable battery voltage and the desired charging voltage is obtained; and the step of varying the duty ratio is performed by changing the duty ratio in coarser steps as the difference increases.

In accordance with yet an additional mode of the invention, a rechargeable battery voltage that is produced as a consequence of charging the rechargeable battery is detected; the rechargeable battery voltage is used as the operating parameter; the duty ratio of the pulsed control signal is varied by: increasing the duty ratio of the pulsed control signal if the detected rechargeable battery voltage of the rechargeable battery is less than a desired charging voltage, and reducing the duty ratio if the detected rechargeable battery voltage of the rechargeable battery is greater than the desired charging voltage; a difference between the detected rechargeable battery voltage and the desired charging voltage is obtained; and the step of varying the duty ratio by changing the duty ratio is performed in coarser steps as the difference increases.

In accordance with yet an added mode of the invention, upon initiating the charging, the duty ratio of the pulsed control signal is set to a minimum value.

In accordance with yet another mode of the invention, each duty ratio value of the pulsed control signal is uniquely associated with a specific value of the rated current supplied by the current source.

In accordance with yet another added mode of the invention, the duty ratio of the pulsed control signal is adjusted as a function of the detected operating parameter such that the rated current supplied by the current source is varied in accordance with a square law.

With the foregoing and other objects in view there is provided, in accordance with the invention an apparatus for charging a rechargeable battery, that includes: a variable current source for providing an unpulsed rated current for recharging a rechargeable battery; a detection device for detecting at least one operating parameter of the rechargeable battery; a control device for producing a pulsed control signal having a specific duty ratio formed as a function of the detected at least one operating parameter of the rechargeable battery; and a current source control device for detecting the duty ratio of the pulsed control signal from the control device and for producing an adjustment signal for the variable current source such that the unpulsed rated current supplied by the current source is adjusted as a function of the duty ratio of the pulsed control signal.

In accordance with an added feature of the invention, the detection device is constructed to detect a rechargeable battery voltage of the rechargeable battery that is produced as a consequence of a charging process; and the rechargeable battery voltage is one of the at least one operating parameter of the rechargeable battery.

In accordance with an additional feature of the invention, an analog/digital converter is connected between the detection device and the control device.

In accordance with another feature of the invention, the variable current source has a specific current characteristic; and the control device is designed to adjust the duty ratio of the pulsed control signal to match the current characteristic that is specific to the variable current source.

In accordance with a further feature of the invention, the current source has an input impedance and a type; the control device includes a current characteristic memory for storing current characteristics for various current source types; the control device is designed to measure the input impedance of the current source before charging the rechargeable battery; and the control device is designed to deduce the type of the current source as a function of the measured input impedance so that one of the current characteristics that corresponds to the deduced type of the current source can be used as a basis for subsequently charging the rechargeable battery.

In accordance with a further added feature of the invention, a control line supplies the pulsed control signal from the control device to the current source control device; and the control device is constructed to measure the input impedance of the current source using the control line.

In accordance with a further additional feature of the invention, the detection device includes a temperature detection device for detecting a temperature of the rechargeable battery as one of the at least one operating parameter; and the control device is constructed to adjust the duty ratio of the pulsed control signal by taking account of the detected temperature of the rechargeable battery.

In accordance with yet an added feature of the invention, the rechargeable battery has a type; the detection device includes a rechargeable battery type identification means for identifying the type of the rechargeable battery; and the control device is constructed to adjust the duty ratio of the pulsed control signal by taking account of the identified type of the rechargeable battery.

In accordance with yet an additional feature of the invention, the pulsed control signal has a plurality of duty ratio values and each one of the plurality of the duty ratios has a uniquely associated corresponding value of the rated current of the current source.

In accordance with yet another feature of the invention, the apparatus is used in combination with an appliance that is operated with the rechargeable battery, and the control device is constructed in the appliance.

In accordance with yet another added feature of the invention, the appliance is a mobile telephone.

In accordance with yet another additional feature of the invention, the control device includes a microcontroller.

According to the invention, a pulsed control signal with a specific duty ratio is admittedly produced as a function of an operating parameter, for example the instantaneous charge state of the rechargeable battery to be charged, in an analogous manner to the second known solution described above. However, in contrast to the solution already described, this pulsed control signal is not used for pulsing the charging current but for setting the rated current supplied from a controllable, that is to say variable, current source as a function of the duty ratio. Thus, in the solution according to the invention, the rechargeable battery is not supplied with a pulsed charging current and there are no switching processes in the current-carrying lines, so that the present invention overcomes the problems associated with the second known solution described above.

Furthermore, in the present invention, the current of the current source is not adjusted by analog voltage limiting of the charging current source, but by the charging process being controlled with the aid of the duty ratio of the pulsed control signal. In contrast to the already described, known "pulsed" solution, the current limit of the controllable current source in the present invention corresponds to the mean charging current.

The pulsed control signal can, possibly after conversion to a reference voltage, be passed via a low-pass filter or the like, resulting in an analog voltage which corresponds to the desired charging current. This analog voltage is then used as a nominal variable for open or closed loop control of the current from the current source, in order to adjust the rated current supply from the current source, as appropriate. In this case, each duty ratio of the pulsed control signal is uniquely associated with a corresponding instantaneous value of the rated current. That is to say the magnitude of the current that is forced to flow from the current source is defined uniquely by the duty ratio of the pulsed control signal and is thus known to the charge controller, without having to be measured directly. Firstly, this reduces the circuit complexity and, secondly, it avoids any voltage drop across a shunt resistor which would otherwise have to be provided in order to measure the current in the charging circuit (see the first known solution described above). Varying the current limit of the current source avoids the possibility of an excessively high voltage occurring between the terminals of the rechargeable battery towards the end of the charging process, due to the internal resistance of the rechargeable battery.

The present invention has the advantage that the overall complexity of the current source, and the costs associated with it, are reduced in comparison to those for the known solutions described above.

Further advantages of the present invention are that there is no need for a high-precision voltage/current regulator, and no power losses occur in the appliance. Different rechargeable batteries can be charged without any additional hardware complexity. Any converters or measurement capabilities which may be present for determining the voltage of the rechargeable battery may still be used. No additional hardware complexity is required when using different final charging voltages for Li-Ion rechargeable batteries.

Other features which are considered as characteristic for the invention are set forth in the appended claims.

Although the invention is illustrated and described herein as embodied in a method and apparatus for charging rechargeable batteries, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
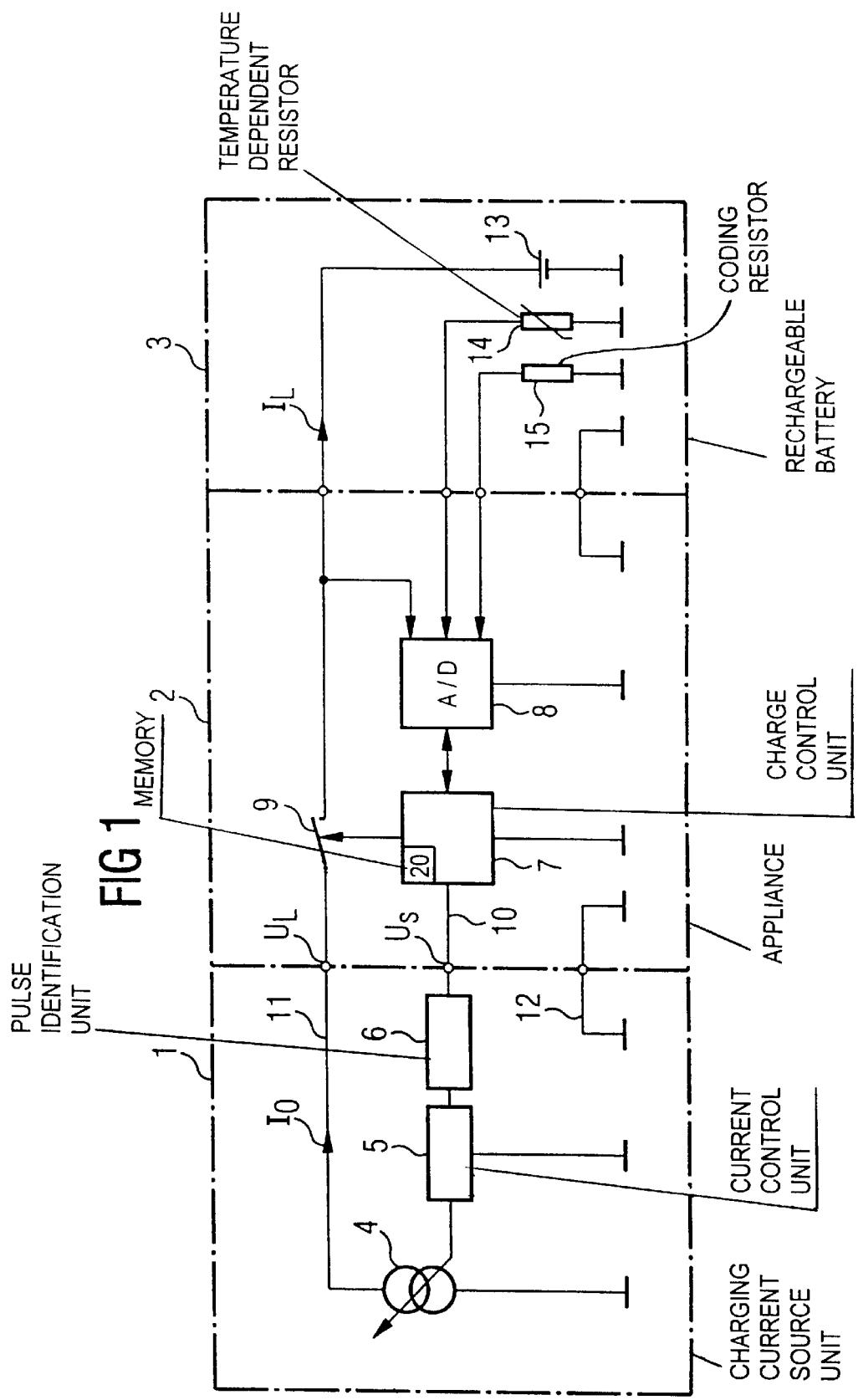
FIG. 1 shows a schematic block diagram of a preferred exemplary embodiment of the present invention.

Referring now to the figures of the drawing in detail and first, particularly, to FIG. 1 thereof, there is shown a simplified block diagram of a preferred exemplary embodiment of an apparatus for charging rechargeable batteries according to the present invention. FIG. 1 shows a charging current source unit 1, an appliance 2 which can be connected to the charging current source unit 1 and has a charge controller, and a rechargeable battery 3 which is to be charged.

The charging current source unit 1 has a controllable, that is to variable, current source 4 which supplies a rated current $I_O$ of specific magnitude. The current source 4 is actuated by a current control unit 5 which, for its part, is coupled to a pulse identification unit 6. The appliance 2 has a charge control unit 7 which, for example, may be in the form of a microcontroller, an A/D converter 8 and a main charging switch 9, via which a charging process can be started and interrupted. The rechargeable battery includes rechargeable battery cells 13, a temperature-dependent resistor 14 which, in particular, is in the form of an NTC thermistor and a coding resistor 15 having a specific, fixed resistance value that is specific to the rechargeable battery.

It can be seen from FIG. 1 that, in addition to two current-carrying lines 11, 12, an additional signal line 10 is provided, so that the charging current source unit 1 is connected via three lines 10–12 to the appliance 2, which may, for example, be a mobile telephone, and is hence also connected to the rechargeable battery 3.

Figure 2:
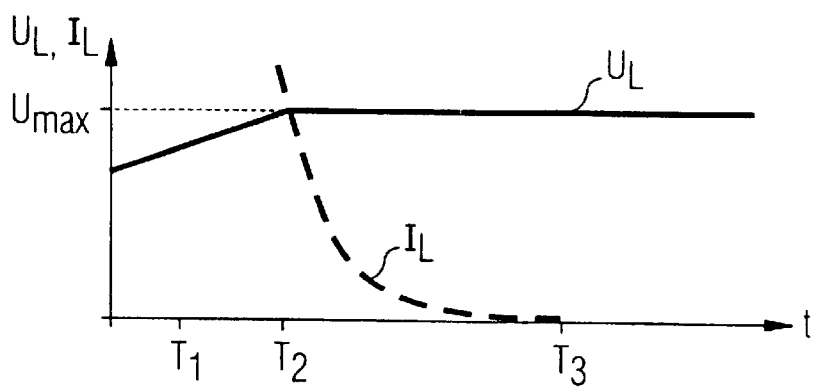
FIG. 2 shows an illustration to indicate the relationship between the charging voltage and the charging current while a rechargeable battery is being charged.

The charging procedure is as follows:

At the start of a charging process, the main switch 9 arranged in the current-carrying conductor 11 is closed by the charge control unit 7, in order thus to complete the charging circuit. The charge control unit 7 then, at regular intervals, measures the instantaneous rechargeable battery voltage of the rechargeable battery 13, that is to say the voltage that is built up in the rechargeable battery 3 as a result of the charging process, and digitally averages this instantaneous rechargeable battery voltage using the A/D converter 8. The current characteristic, shown in FIG. 2, for the controllable current source 4 is known to the charge control unit 7, and is thus stored in the appliance 2. The charge control unit 7 can thus produce a control signal for the controllable current source 4 as a function of the measured rechargeable battery voltage of the rechargeable battery 3, and this control signal ensures that the respectively desired charging voltage is reached, but is never exceeded. According to the present invention, this is achieved by the charge control unit 7 producing a pulsed control signal whose duty ratio, that is to say its pulse-pause ratio, is adjusted as a function of the charge state, that is to say is a function of the rechargeable battery voltage of the rechargeable battery 3. This pulsed control signal is supplied via the signal line 10 shown in FIG. 1 to the pulse identification unit 6 in the charging current source unit 1. The pulsed control signal thus received can, possibly after being converted to a reference voltage, be supplied via a low-pass filter (not shown), in order to produce an analog control signal which corresponds to the desired charging or rated current. This analog control signal is supplied to the current control unit 5 shown in FIG. 1 as a nominal variable for the rated current $I_O$ to be supplied from the current source 4, so that the current source 4 is actuated by the current control unit 5 in such a manner that it emits a rated current $I_O$ corresponding to the duty ratio of the pulsed control signal. The magnitude of the current which is forced to flow from the current source 4 is thus defined uniquely by the duty ratio of the pulsed control signal.

When adjusting the duty ratio, the charge control unit 7 can additionally or alternatively take into account further operating parameters, such as the temperature of the rechargeable battery cells 13 in particular, in addition to the rechargeable battery voltage. The temperature-dependent resistor 14, which has already been mentioned above, is provided for this purpose. The charge control unit 7 can deduce the temperature of the rechargeable battery cells 13 by monitoring the resistance value of the resistor 14, in order to adjust the duty ratio of the pulsed control signal supplied to the pulse identification unit 6, and in order to regulate the rated current $I_O$ emitted from the current source 4. Furthermore, the charge control unit 7 can be designed such that it determines the type of the rechargeable battery 3 to be charged, preferably before the start of the charging process, and appropriately takes account of this in adjusting the duty ratio of the pulsed control signal. For this purpose, the coding resistor 15, which has likewise already been mentioned above, is provided in the rechargeable battery 3, and its resistance value uniquely identifies the type of rechargeable battery 3. It is thus possible, by measuring the resistance value of this coding resistor 15, for the charge control unit 7 to determine the type of rechargeable battery 3 uniquely before the start of the charging process, that is to say before closing the main switch 9, or during the charging process, and to take this into account in adjusting the duty ratio. In this case, a number of values for the maximum charging current and/or the maximum charging voltage which are associated with the various rechargeable battery types are stored in the charge control unit 7. Once the type of rechargeable battery which is to be charged has been defined, the charge control unit 7 reads the values appropriate to the defined type of rechargeable battery and then adjusts the duty ratio of the pulsed control signal to match these values so that the current characteristic, for example the current characteristic shown in FIG. 2, appropriate to the respective type of rechargeable battery is produced or is set in the subsequent charging process.

At the start of the charging process, the charge control unit 7 sets a duty ratio which is as low as possible, in order that the charging current which flows is as low as possible. The duty ratio of the pulsed control signal supplied via the signal line 10 to the pulse identification unit 6 is then raised until the maximum charging current or the maximum charging voltage is reached. From then on, the regulation is based on the maximum charging voltage. As soon as the desired charging voltage has been exceeded, the charge control unit 7 reduces the duty ratio, and thus reduces the charging current or the rated current $I_O$. If, on the other hand, the desired voltage is not reached, the duty ratio is increased in order to raise the charging current supplied to the rechargeable battery 3. The duty ratio change steps can be matched dynamically to the respective difference between the desired charging voltage and the instantaneous rechargeable battery voltage. If the voltage differences are large, the duty ratio can thus be varied in coarser steps by the charge control unit 7 while, when the voltage differences are relatively small, the duty ratio can be varied more finely.

Figure 3A:
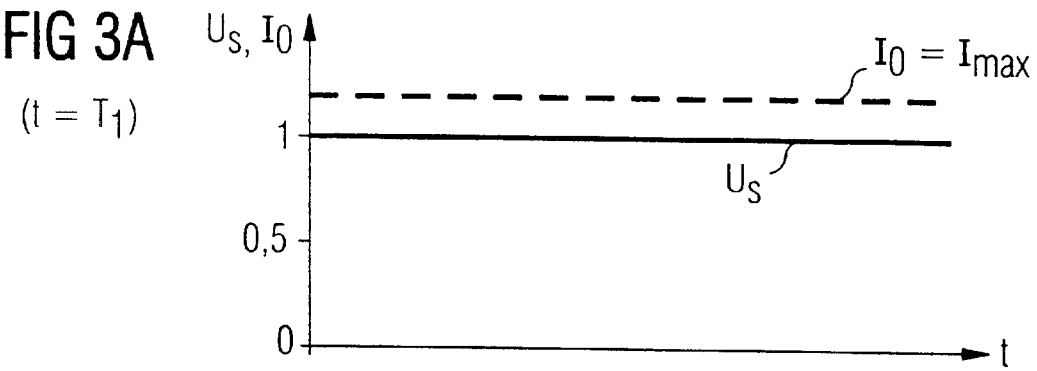
FIGS. 3A–3C show illustrations to indicate the adjustment of the rated current as a function of the duty ratio according to the present invention.
Figure 3B:
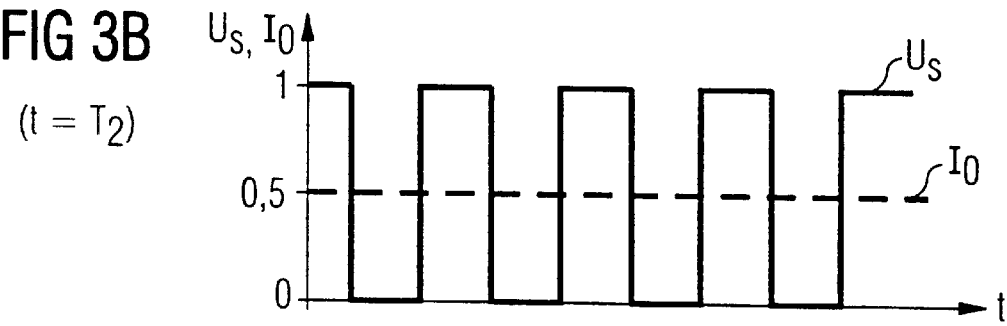
Figure 3C:
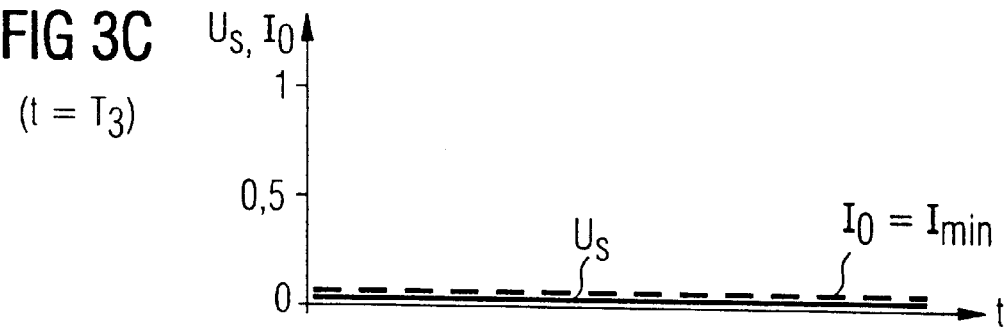

The charge control unit 7 and the current control unit 5 are designed such that a duty ratio of the pulsed control signal of 100% corresponds to a maximum charging or rated current $I_O$ from the controllable current source 4. At a duty ratio of 100%, the pulsed control signal supplied via the signal line 10 to the pulse identification unit 6 is always at a high level. This is illustrated schematically in FIG. 3A, with the illustration showing the relationship that occurs in this case between the level of the pulsed control signal $U_S$, which is applied to the pulse identification unit 6, and the rated current $I_O$ supplied from the controllable current source 4. It can be seen from FIG. 3A that the level of the pulsed control signal $U_S$ is permanently at the high level and, accordingly, the controllable current source 4 is actuated by the current control unit 5 such that it emits a maximum rated current $I_O = I_{max}$. The situation shown in FIG. 3A occurs, for example at the time $T_2$ in FIG. 2. In contrast, a minimum rated current is set when the duty ratio is 0%. In this case, the pulsed control signal is permanently at the low level, and the controllable current source 4 is actuated by the current control unit 5 such that it emits a minimum rated current $I_O = I_{min}$. This situation is illustrated in FIG. 3C and occurs, for example, at the time $T_3$ in FIG. 2. Between the limit cases illustrated in FIGS. 3A and 3C, the duty ratio of the pulsed control signal is adjusted as appropriate to set the rated current $I_O$ of the controllable current source 4 between the limit values $I_{min}$ and $I_{max}$. By way of example, the rated current $I_O$ can be varied linearly as a function of the duty ratio of the pulsed control signal, so that, for example in the situation shown in FIG. 3B, where the duty ratio is 50%, a medium rated current $I_O$ is supplied from the current source 4. This situation occurs, for example, at the time $T_2$ in FIG. 2.

However, in addition to varying the rated current $I_O$ of the controllable current source 4 linearly, it is also possible to vary the rated current in accordance with a square law. The charge control unit 7 must, of course, know whether the rated current $I_O$ of the controllable current source 4 is intended to be varied linearly or in accordance with a square law as a function of the duty ratio. Furthermore, of course, opposite polarities to those situations illustrated in FIGS. 3A–3C are also feasible.

As illustrated in FIG. 1, although a specific signal line 10 is required for controlling the current source 4, the overall complexity of the current source and the costs associated with it are, nevertheless, reduced in comparison to those for the previously known solutions.

Furthermore, the signal line 10 shown in FIG. 1 can advantageously be used if the apparatus according to the invention is intended to be operated with different types of current sources, that is to say with different power supply units or motor vehicle chargers. This situation can occur, for example when a relatively low-power current source is intended to be offered, for cost reasons, as a standard power supply unit with low-cost appliances, while more powerful power supply units can be purchased as accessories. With the previously known solutions, this situation meant that complex measurement of the charging current of the respective current source was required in order to make it possible to distinguish between the current sources. In contrast, in this situation, the additional signal unit 10 provided in FIG. 1 can be used to identify the respectively used current source. In this case, it is assumed that each type of current source is characterized by the respective current source having a unique input impedance. Thus, before the charging process starts, the charge control unit 7 can measure the input impedance of the connected current source, digitally or in analog form, via the signal line 10, and can thus deduce the type of current source 4. The charge control unit 7 can, for example, include a memory 20 that stores values of input impedances that correspond to different types of current sources. By comparing the measured input impedance with the stored input impedances, the charge control unit 7 can deduce which type of current source is connected. The memory 20 can also store data relating to values of the duty ratio that should be used with the connected type of current source 4. After identification of the type of current source, the charge control unit 7 can adjust the duty ratio of the pulsed control signal, which is likewise supplied via the signal line 10 to the pulse identification unit 6, taking account of the type of current source 4 which has been found.

We claim:

1. A method for charging a rechargeable battery, which comprises:
    charging a rechargeable battery with an unpulsed rated current supplied from a variable current source;
    detecting at least one operating parameter of the rechargeable battery;
    providing a pulsed control signal having a specific duty ratio and producing the duty ratio as a function of the operating parameter; and
    adjusting the unpulsed rated current supplied from the current source as a function of the duty ratio of the pulsed control signal.

2. The method according to claim 1, which comprises:
    detecting a rechargeable battery voltage that is produced as a consequence of charging the rechargeable battery; and
    using the rechargeable battery voltage as the operating parameter.

3. The method according to claim 2, which comprises:
    increasing the duty ratio of the pulsed control signal if the detected rechargeable battery voltage of the rechargeable battery is less than a desired charging voltage; and
    reducing the duty ratio if the detected rechargeable battery voltage of the rechargeable battery is greater than the desired charging voltage.

4. The method according to claim 2, which comprises digitally averaging the rechargeable battery voltage before evaluating the rechargeable battery voltage.

5. The method according to claim 1, which comprises digitally averaging the detected operating parameter of the rechargeable battery before evaluating the detected operating parameter.

6. The method according to claim 1, which comprises adjusting the duty ratio of the pulsed control signal as a function of a current characteristic that is specific to the current source.

7. The method according to claim 6, which comprises:
    before starting the step of charging the rechargeable battery, measuring the input impedance of the current source to determine a type of the current source; and
    basing the charging on a current characteristic that corresponds to the determined type of the current source.

8. The method according to claim 1, which comprises adjusting the duty ratio of the pulsed control signal as a function of a type of rechargeable battery.

9. The method according to claim 1, which comprises:
    detecting a temperature of the rechargeable battery; and
    using the detected temperature as the operating parameter.

10. The method according to claim 1, which comprises performing the step of determining the operating parameter of the rechargeable battery at regular intervals.

11. The method according to claim 1, which comprises increasing the unpulsed rated current of the current source as the duty ratio of the pulsed control signal increases.

12. The method according to claim 11, which comprises defining the duty ratio as a ratio between a pulse duration and a pause duration of the pulsed control signal.

13. The method according to claim 11, which comprises: varying the duty ratio of the pulsed control signal by:
    increasing the duty ratio of the pulsed control signal if the detected rechargeable battery voltage of the rechargeable battery is less than a desired charging voltage, and
    reducing the duty ratio if the detected rechargeable battery voltage of the rechargeable battery is greater than the desired charging voltage.

14. The method according to claim 13, which comprises:
    obtaining a difference between the detected rechargeable battery voltage and the desired charging voltage; and
    performing the step of varying the duty ratio by changing the duty ratio in coarser steps as the difference increases.

15. The method according to claim 1, which comprises:
    detecting a rechargeable battery voltage that is produced as a consequence of charging the rechargeable battery;
    using the rechargeable battery voltage as the operating parameter;
    varying the duty ratio of the pulsed control signal by:
        increasing the duty ratio of the pulsed control signal if the detected rechargeable battery voltage of the rechargeable battery is less than a desired charging voltage, and reducing the duty ratio if the detected rechargeable battery voltage of the rechargeable battery is greater than the desired charging voltage;

obtaining a difference between the detected rechargeable battery voltage and the desired charging voltage; and performing the step of varying the duty ratio by changing the duty ratio in coarser steps as the difference increases.

16. The method according to claim 1, which comprises upon initiating the charging, setting the duty ratio of the pulsed control signal to a minimum value.

17. The method according to claim 1, which comprises uniquely associating each duty ratio value of the pulsed control signal with a specific value of the rated current supplied by the current source.

18. The method according to claim 1, which comprises adjusting the duty ratio of the pulsed control signal as a function of the detected operating parameter such that the rated current supplied by the current source is varied in accordance with a square law.

19. An apparatus for charging a rechargeable battery, comprising:

a variable current source for providing an unpulsed rated current for recharging a rechargeable battery;

a detection device for detecting at least one operating parameter of the rechargeable battery;

a control device for producing a pulsed control signal having a specific duty ratio formed as a function of the detected at least one operating parameter of the rechargeable battery; and a current source control device for detecting the duty ratio of the pulsed control signal from said control device and for producing an adjustment signal for said variable current source such that the unpulsed rated current supplied by said current source is adjusted as a function of the duty ratio of the pulsed control signal.

20. The apparatus according to claim 19, wherein:

a rechargeable battery voltage of the rechargeable battery is produced as a consequence of recharging the rechargeable battery;

said detection device is constructed to detect the rechargeable battery voltage;

said rechargeable battery voltage is one of the at least one operating parameter of the rechargeable battery.

21. The apparatus according to claim 20, comprising an analog/digital converter that is connected between said detection device and said control device.

22. The apparatus according to claim 19, comprising an analog/digital converter that is connected between said detection device and said control device.

23. The apparatus according to claim 19, wherein:

said variable current source has a specific current characteristic; and said control device is designed to adjust the duty ratio of the pulsed control signal to match the current characteristic that is specific to said variable current source.

24. The apparatus according to claim 23, wherein:

said current source has an input impedance and a type;

said control device includes a current characteristic memory for storing current characteristics for various current source types;

said control device is designed to measure said input impedance of said current source before charging the rechargeable battery; and said control device is designed to deduce said type of said current source as a function of the measured input impedance so that one of the current characteristics that corresponds to said deduced type of said current source can be used as a basis for subsequently charging the rechargeable battery.

25. The apparatus according to claim 24, comprising:

a control line supplying the pulsed control signal from said control device to said current source control device;

said control device being constructed to measure the input impedance of said current source using said control line.

26. The apparatus according to claim 19, wherein:

said detection device includes a temperature detection device for detecting a temperature of the rechargeable battery as one of the at least one operating parameter; and said control device is constructed to adjust the duty ratio of the pulsed control signal by taking account of the detected temperature of the rechargeable battery.

27. The apparatus according to claim 19, wherein:

said rechargeable battery has a type;

said detection device includes a rechargeable battery type identification means for identifying the type of said rechargeable battery; and said control device is constructed to adjust the duty ratio of the pulsed control signal by taking account of the identified type of the rechargeable battery.

28. The apparatus according to claim 19, wherein the pulsed control signal has a plurality of duty ratio values and each one of the plurality of the duty ratios has a uniquely associated corresponding value of the rated current of said current source.

29. The apparatus according to claim 19, in combination with an appliance that is operated with the rechargeable battery, wherein said control device is constructed in the appliance.

30. The combination according to claim 29, wherein the appliance is a mobile telephone.

31. The apparatus according to claim 15, wherein said control device includes a microcontroller.

* * * * *